United States Patent [19]

Thorp

[11] Patent Number: 5,224,076
[45] Date of Patent: Jun. 29, 1993

[54] WRISTWATCH RADIOTELEPHONE

[75] Inventor: Christopher S. Thorp, Mystic, Conn.

[73] Assignee: Timex Corporation, Middlebury, Conn.

[21] Appl. No.: 961,654

[22] Filed: Oct. 16, 1992

[51] Int. Cl.$^5$ .................. G04B 47/00; H04M 1/03
[52] U.S. Cl. .................................. 368/10; 368/13; 368/282; 379/433; 379/434
[58] Field of Search ............ 368/10, 13, 278, 281–283; 224/164, 167, 175; 379/428, 433, 434

[56] References Cited

U.S. PATENT DOCUMENTS

| 3,032,651 | 5/1962 | Gisiger-Stahl et al. | 250/14 |
| 4,847,818 | 7/1989 | Olsen | 368/10 |
| 4,884,252 | 11/1989 | Teodoridis et al. | 368/10 |
| 4,926,474 | 5/1990 | Marks | 379/433 |
| 5,152,693 | 10/1992 | Matsui et al. | 439/37 |

Primary Examiner—Vit W. Miska
Attorney, Agent, or Firm—Robert R. Jackson

[57] ABSTRACT

A wristwatch radiotelephone having a plurality of telescopically arranged substantially rigid members and a flexible strap member joined to the proximal end of the endmost rigid member. The rigid members house a radiotelephone speaker, microphone, display, dialing buttons, and control buttons. When the rigid members are extended, the radiotelephone is accessible and the flexible member is contained within the rigid members. When the rigid members are collapsed, the flexible member may be extended around a wrist to attach the rigid members and radiotelephone to a wrist.

15 Claims, 3 Drawing Sheets

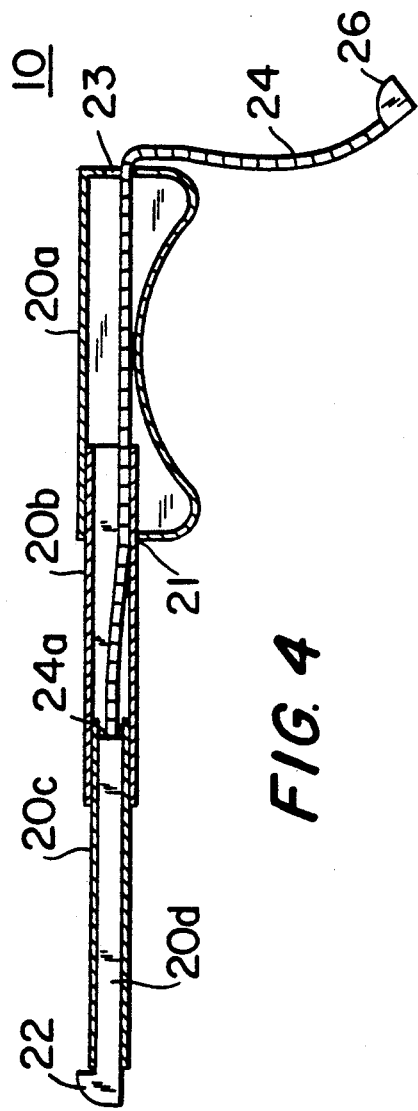
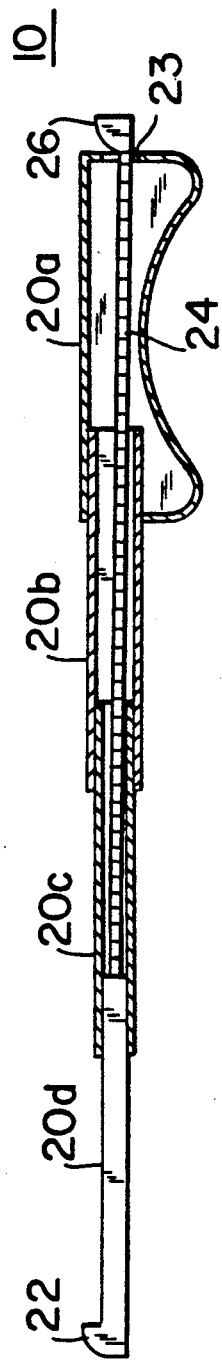
FIG. 4
FIG. 5

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which has a flexible wristwatch band yet also forms substantially the same definite, predetermined shape each time the structure is reconfigured as a radiotelephone. This would provide a more comfortable fit as a wristwatch yet tend to give the article a more substantial "feel" when used as a radiotelephone. The article thus may be more acceptable and attractive to at least some users.

In view of the foregoing, it is an object of this invention to provide a wristwatch radiotelephone which has a first flexible configuration for use as a wristwatch, and a second more rigid configuration for use as a radiotelephone.

It is a more particular object of this invention to provide a wristwatch radiotelephone which has a flexible wristwatch band when configured for use as a wristwatch, and which can be made to positively assume a substantially rigid predetermined elongated shape when configured for use as a radiotelephone.

SUMMARY OF THE INVENTION

These and other objects of the invention are accomplished in accordance with the principles of the invention by providing a wristwatch radiotelephone comprising a plurality of substantially rigid members and a flexible wristwatch band. The rigid members are telescopically arranged so that when expanded the apparatus may be used as a radiotelephone, and when collapsed the band is more readily accessible and the apparatus may be used as a wristwatch.

Further features of the invention, its nature and various advantages will be more apparent from the accompanying drawings and the following detailed description of the preferred embodiments.

BRIEF DESCRIPTION OF THE DRAWINGS

FIGS. 3 and 4 are simplified side and sectional views of the apparatus of FIG. 1 in transitional configurations.

FIG. 5 is a simplified side and sectional view of the apparatus of FIG. 1 opened out to the radiotelephone configuration.

FIG. 7 also shows a possible additional feature that the apparatus may be provided with in accordance with this invention.

DETAILED DESCRIPTION OF THE PREFERRED EMBODIMENTS

Olsen U.S. Pat. No. 4,847,818, which is hereby incorporated by reference herein, shows all of the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
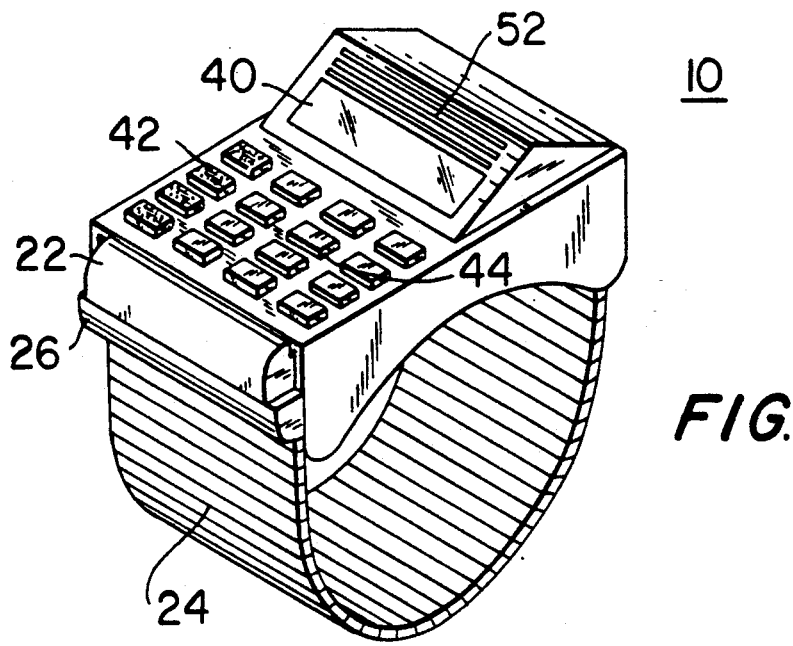
FIG. 1 is a simplified perspective view of an illustrative embodiment of a wristwatch radiotelephone constructed in accordance with the principles of this invention in the wristwatch configuration.

As shown in FIG. 1, an illustrative preferred embodiment of a wristwatch radiotelephone 10 constructed in accordance with this invention includes a main body member 20a and a wristwatch band 24 made up of a plurality of links. When arranged as shown in FIG. 1, apparatus 10 closely resembles a conventional wristwatch. Main body member 20a includes a display 40, timepiece and telephone control buttons 42, and telephone dialing buttons 44 (respectively similar to elements 10-12 in the above-mentioned Olsen patent). Clasps 22 and 26 meet to close wristwatch band 24 about the wearer's wrist. However, any other known means may be used to secure band 24 around the wearer's wrist.

Figure 2:
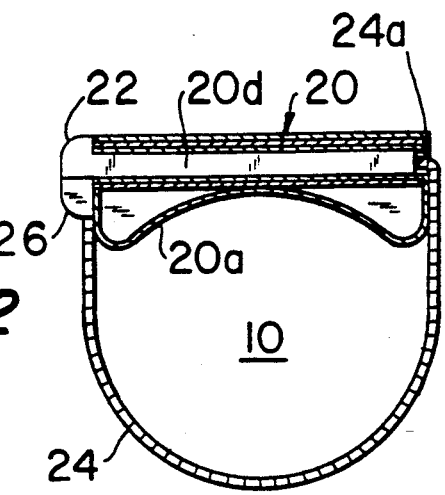
FIG. 2 is a simplified side and sectional view of the apparatus of FIG. 1.
Figure 7:
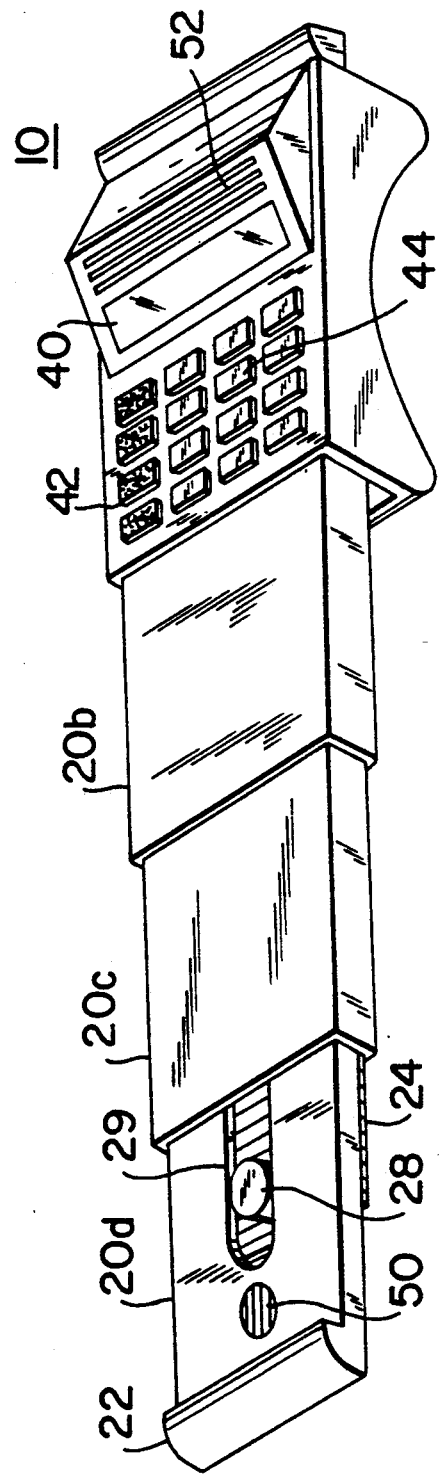
FIG. 7 is a simplified perspective view of apparatus similar to that shown in FIG. 6, from a different angle and showing the outer case.

A simplified side and sectional view of apparatus 10 in the configuration of FIG. 1 is shown in FIG. 2. Main body member 20a is shown as the outermost member of telescopically related rigid members 20. In the wristwatch configuration, members 20 are collapsed to reduce the size of the radiotelephone to a compact apparatus easily worn around the wrist. End 24a of band 24 is attached to innermost rigid member 20d. If desired, end 24a may be attached to member 20d by a detented sliding mechanism 28 in slot 29 such as shown in FIG. 7. Such attachment allows for adjustment of strap length according to wrist size, yet still permits total retraction of the band into extended members 20a, 20b, and 20c, as described below. Alternatively or in addition, band 24 may be a resilient expansion band.

Figure 3:
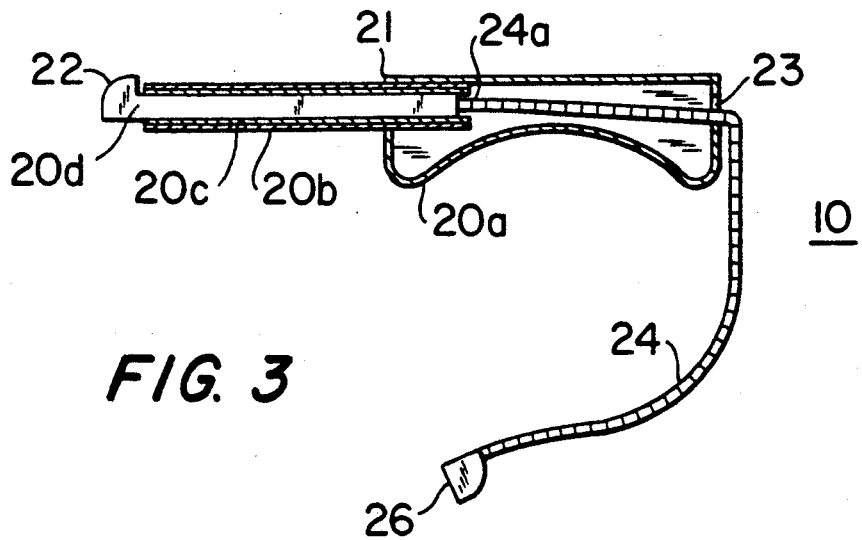
Figure 6:
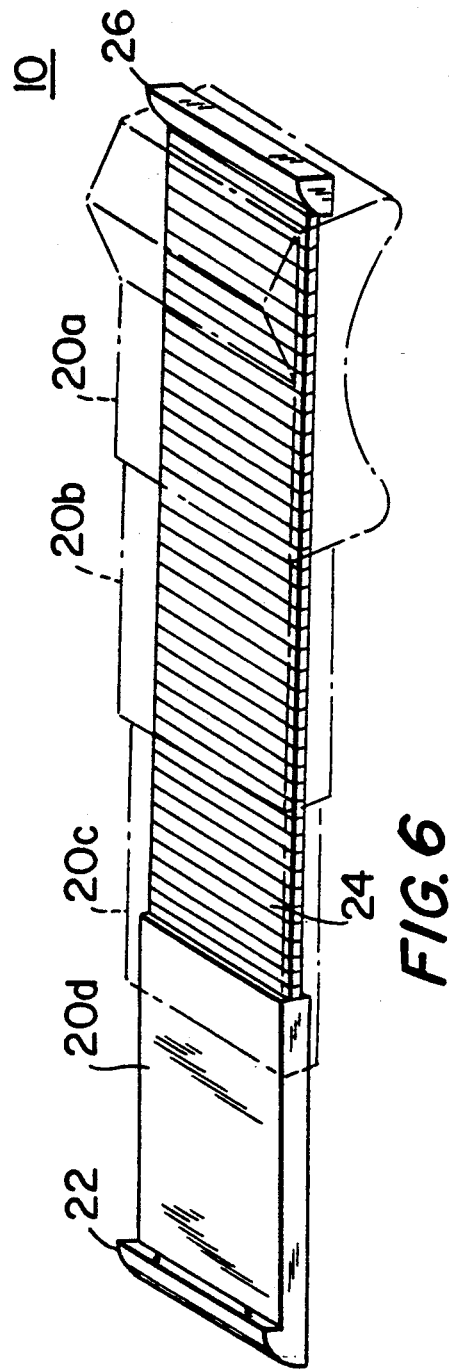
FIG. 6 is a simplified perspective view of the apparatus of FIG. 5, with the outer casing in shadow to reveal the wristwatch band inside.

When clasps 22 and 26 are undone and apparatus 10 is removed from the wrist, members 20 may be extended, as shown in FIGS. 3 and 4 to form the final elongated, substantially straight arrangement shown in FIGS. 5-7. Members 20a, 20b, and 20c are preferably hollow to allow members 20 to telescope relative to one another. If desired, member 20d may be substantially solid. As described herein, the proximal end of each member 20b-20d is the end closer to main body member 20a, and the distal end of each member 20b-20d is the end farther from main body member 20a when members 20 are extended as in FIGS. 5-7. To extend members 20b, 20c, and 20d from inside main body member 20a through aperture 21, the user may grasp clasp 22 on the distal end of innermost member 20d. Although clasp 22 may have any desired form, preferably clasp 22 is curved as shown in the Figures for aesthetic purposes and to facilitate gripping. Preferably members 20 are provided with stops so that members 20 remain connected to one another when extended. Members 20 may also be provided with interengaging detents which tend to maintain the apparatus in either the fully collapsed form (FIGS. 1 and 2) or the fully extended form (FIGS. 5-7). Or there may be sufficient frictional engagement between members 20 so that they tend to remain in whatever state of extension or retraction they are manually placed.

As has been mentioned, end 24a of band 24 is attached to innermost rigid member 20d (e.g., either at the proximal end of member 20d as shown in FIGS. 2-6, or via the adjustment mechanism 28 shown in FIG. 7 and described above). As members 20b-20d are drawn out of main body 20a, band 24 is drawn into main body member 20a and hollow members 20b and 20c through aperture 23 in member 20a. When members 20 are fully extended, clasp 26 on band 24 may engage aperture 23 so that band 24 remains relatively straight inside members 20. An elongated position of band 24 within members 20 is desirable for optimal alignment of an optional antenna within band 24, and also to facilitate removal of band 24 from within members 20. Although any desired clasp may be used, preferably a partially curved clasp as shown in the Figures is used, so that when in the wristwatch configuration of FIGS. 1 and 2, clasps 22 and 26 align with one another. Clasp 26 may be attached to band 24 in any desired manner and in any desired orientation. In the preferred embodiment, clasp 26 is rigidly joined at a corner as shown in FIG. 2. Such fixed orientation of clasp 26 with respect to band 24 facilitates gripping to pull out band 24 from within members 20 when collapsing extended members 20. Preferably clasp 26 includes a boss along a straight face which releasably mates with an aperture in clasp 22 or main body member 20a. The locations of such boss and groove may, however, be reversed.

When apparatus 10 has been rearranged to the elongated configuration shown in FIGS. 5-7 and the user holds the apparatus in one hand along one side of his or her face, a radiotelephone microphone 50 preferably on member 20d and a radiotelephone speaker 52 preferably on main body member 20a are spaced apart and otherwise positioned and oriented for simultaneous use adjacent the user's mouth and ear, respectively. Elements 50 and 52 are respectively similar to elements 6 and 8 in the above-mentioned Olsen patent.

Because of the telescopic relation of members 20, a comfortable wristwatch band 24 may be used when members 20 are collapsed into a wristwatch configuration. Additionally, such telescopic relation limits movement of substantially rigid members 20 relative to one another so that apparatus 10 always positively assumes substantially the same predetermined shape each time it is opened up to the radiotelephone configuration.

It will be understood that the foregoing is merely illustrative of the principles of this invention, and that various modifications can be made by those skilled in the art without departing from the scope and spirit of the invention. For example, elements 40, 42, 44, 50, and 52 can be placed in any desired locations on the apparatus. The present embodiments are described for the purpose of illustration rather than limitation, and the present invention is limited only by the claims which follow.

What is claimed is:

1. Apparatus which is convertible between a first configuration adapted for wearing the wrist as a wristwatch and a second configuration having an elongated shape in which said apparatus is suitable use as a ha held radiotelephone with a microphone and speaker adjacent respective opposite ends of said elongated shape, said apparatus comprising:
   a plurality of substantially rigid members telescopically arranged such that said rigid members may be extended into said second configuration; and
   a flexible member for securing said apparatus around a wrist when said rigid members are collapsed.

2. The apparatus defined in claim 1 wherein said rigid members include a main body member into which the remaining said rigid members are collapsed.

3. The apparatus defined in claim 2 wherein said main body member includes a radiotelephone display and a radiotelephone speaker.

4. The apparatus defined in claim 3 wherein said main body member further includes radiotelephone dialing buttons and radiotelephone control buttons.

5. The apparatus defined in claim 2 wherein said rigid members include an endmost member positioned furthest from said main body member when said apparatus is in said second configuration, and wherein the remaining rigid members are substantially hollow.

6. The apparatus defined in claim 5 wherein said endmost rigid member includes a radiotelephone microphone.

7. The apparatus defined in claim 5 wherein said endmost rigid member includes gripping means for grasping to extend said rigid members from a collapsed configuration into said second configuration.

8. The apparatus defined in claim 5 wherein said flexible member is joined to said endmost rigid member such that said flexible member extends along the length of said apparatus through said hollow rigid members when said hollow rigid members are extended into said second configuration.

9. The apparatus defined in claim 8 wherein said flexible member has a free end having catch means for catching on said main body member so that said flexible member remains relatively elongated when said rigid members are extended.

10. The apparatus defined in claim 9 wherein said flexible member extends from the end of said main body member opposite the end from which said rigid members extend when said apparatus is in said second configuration.

11. The apparatus defined in claim 8 wherein said flexible member has a free end having catch means for joining said flexible member to the end of said main body member from which said rigid members extend to secure said apparatus around a wrist in said first configuration.

12. The apparatus defined in claim 11 wherein the free end of said endmost rigid member includes gripping means for grasping to extend said rigid members into said second configuration, and said catch means aligns with said gripping means when said flexible member is secured around a wrist.

13. The apparatus defined in claim 12 wherein said catch means in secured to said gripping means when said apparatus is in said second configuration.

14. The apparatus defined in claim 12 wherein said catch means in secured to said main body member when said apparatus is in said second configuration.

15. The apparatus defined in claim 8 further comprising:
   means for adjusting the point of attachment of said flexible member to said endmost rigid member.

* * * * *

UNITED STATES PATENT AND TRADEMARK OFFICE
CERTIFICATE OF CORRECTION

PATENT NO. : 5,224,076

DATED : June 29, 1993

INVENTOR(S) : Christopher S. Thorp

It is certified that error appears in the above-identified patent and that said Letters Patent is hereby corrected as shown below:

| Column | Line | |
|---|---|---|
| 3 | 64 | After "wearing" insert --around--. |
| 3 | 66 | After "suitable" insert --for--. |
| 3 | 66 | Change "ha held" to --hand-held--. |
| 4 | 58 | Change "in" to --is--. |
| 4 | 61 | Change "in" to --is--. |

Signed and Sealed this

Third Day of May, 1994

Attest:

*Attesting Officer*

BRUCE LEHMAN

*Commissioner of Patents and Trademarks*